United States Patent [19]
Silva et al.

[11] 3,874,299
[45] Apr. 1, 1975

[54] ELECTROMAGNETIC SWITCHING

[75] Inventors: Tony H. Silva, Van Nuys; Arthur Schnitt, Los Angeles, both of Calif.

[73] Assignee: The Aerospace Corporation, Los Angeles, Calif.

[22] Filed: Oct. 29, 1973

[21] Appl. No.: 410,845

Related U.S. Application Data
[63] Continuation of Ser. No. 301,600, Oct. 27, 1972, abandoned.

[52] U.S. Cl. .............................. 104/130, 104/105
[51] Int. Cl. .......................................... E01b 25/06
[58] Field of Search ....... 104/96, 105, 130, 148 MS, 104/148 LM, 148 SS, 23 FS

[56] References Cited
UNITED STATES PATENTS

| | | |
|---|---|---|
| 3,158,765 | 11/1964 | Polgreen .... |
| 3,680,488 | 8/1972 | Donlon ............................ 104/23 FS |
| 3,763,788 | 10/1973 | Pougue .......................... 104/148 MS |
| 3,828,686 | 8/1974 | Steenbeck ........................... 104/130 |

*Primary Examiner*—M. Henson Wood, Jr.
*Assistant Examiner*—D. W. Keen
*Attorney, Agent, or Firm*—Francis R. Reilly

[57] ABSTRACT

Trackway guided vehicles are constrained to travel in a selected branch of a trackway switch by electromagnetic attraction with the electromagnets also serving as elements of a linear electric motor. Magnetic field strength sensing means detects the presence or absence of the electromagnetic field on a diverging switchway and controls actuation of guideway interlocks to restrict vehicle travel selectively in the left or right exit branch of the switch in the event of power failure to the electromagnets.

7 Claims, 8 Drawing Figures

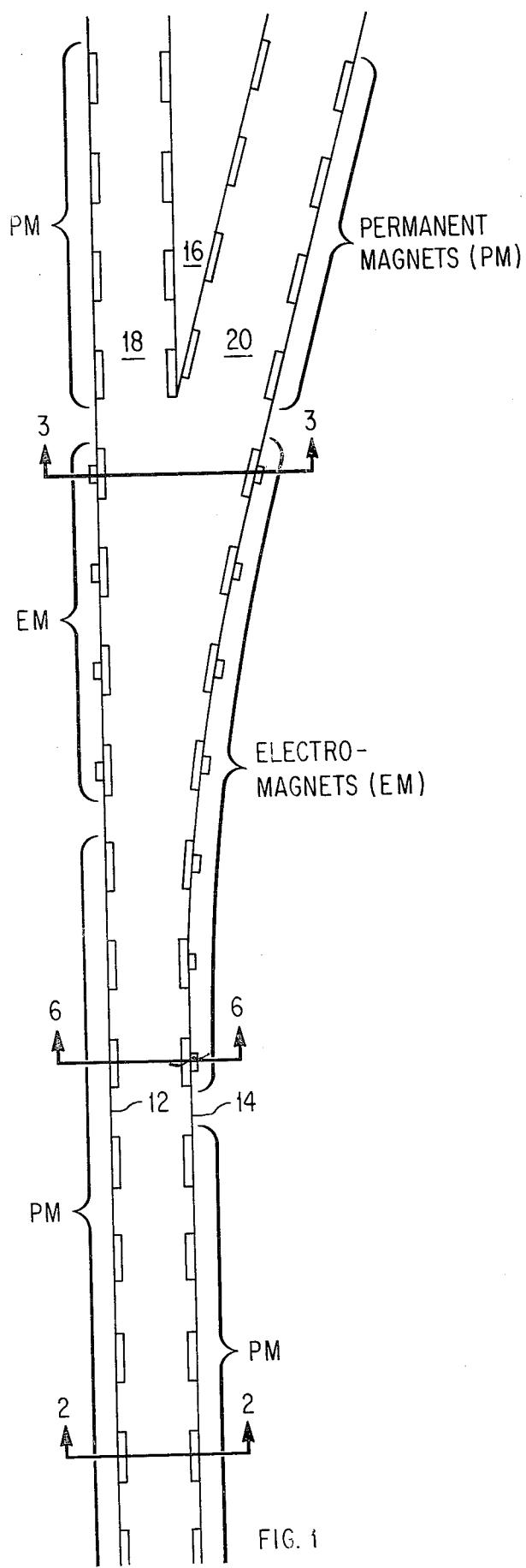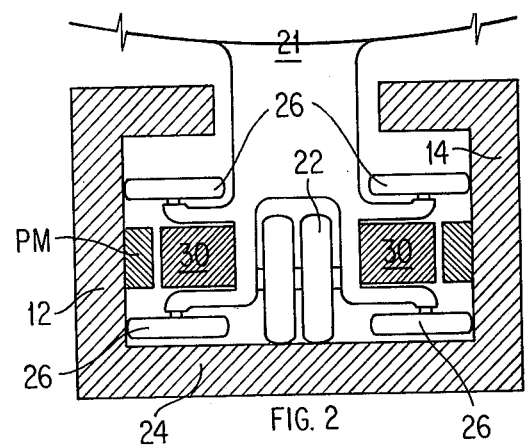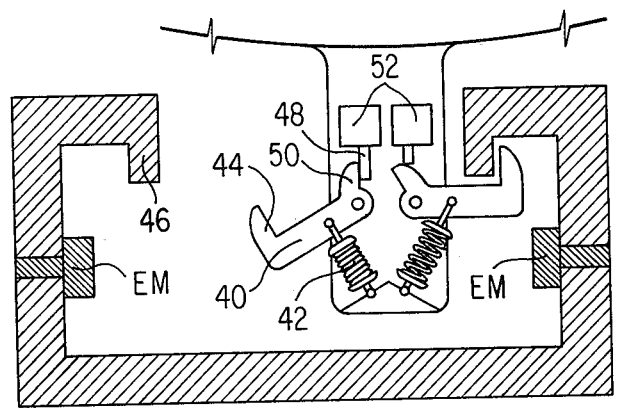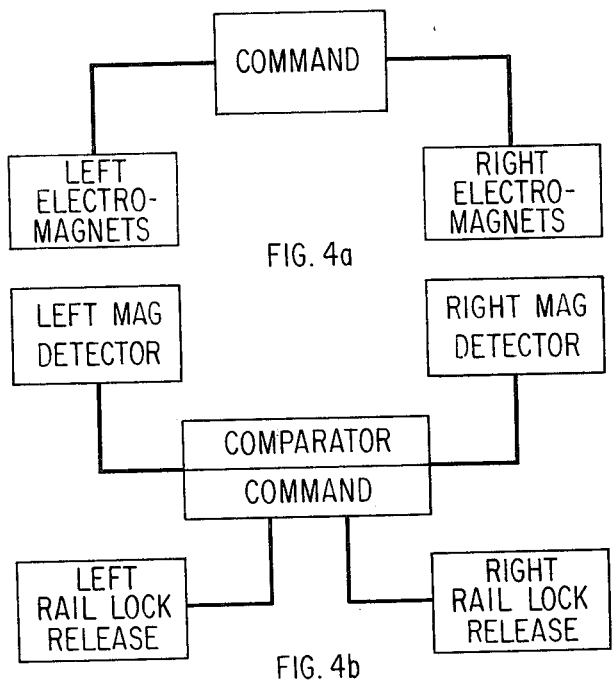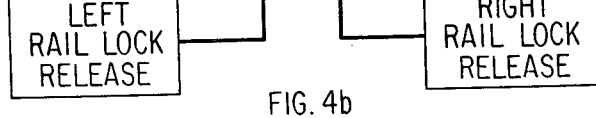

ELECTROMAGNETIC SWITCHING

PRIOR APPLICATION

This application is a continuation of patent application Ser. No. 301,600 filed Oct. 27, 1972, now abandoned.

BACKGROUND OF THE INVENTION

1. Field of the Invention

The invention relates to trackways for guiding vehicles, the trackways having opposed spaced magnets mounted therealong to constitute the stator coacting with a vehicle mounted "rotor" of a linear electric motor. The opposed magnets at a trackway switch are selectively electrically energized to direct the vehicle into the desired switch branch.

2. Description of the Prior Art

Many of advanced modes of urban transportation being currently developed involve an intricate network of vehicle guideways serving all locales of densely populated areas. These guideways accommodate, at peak capacity, an endless stream of individualized vehicles operating at very close headway and at moderately high velocity. Each vehicle is automatically computer controlled to follow the most efficient routing through the network from origin to any desired destination. An overall system of this type is generally defined in U.S. Pat. No. 3,403,634 entitled "Automatically Controlled Railway Passenger Vehicle System".

Transportation systems of this type cannot employ conventional switches having movable rail sections because the required speed of switching cannot be mechanically attained. Alternate means previously used or suggested, as in the above mentioned patent, employ vehicle-mounted arms acting against the rails or guideway to selectively confine vehicle travel to one branch of the switch. A still further form of switch utilizes the attraction forces of electromagnets to selectively draw the vehicles to the left or right into the desired switch branch. A typical system of this type is more fully defined in a report of The John Hopkins University, "Transportation Technology Distribution System for a High Density Urban Area" (May 1, 1970), report APL/JHU TCR008.

Vehicle propulsion has received much attention and the most attractive and promising appears to be the linear electric motor (LEM). One form of LEM incorporates a series of equally spaced permanent magnets mounted lineally along opposite sides of the vehicle trackway. The magnets in each series are of alternating polarity and the magnets of one series confront or are directly across from the magnets in the other series. The movable rotor is a vehicle attached ferrous core that sweeps along in close proximity to both series of magnets and closes the flux paths between adjacent magnets. Coil Current conductors across the face of the rotor core cut the flux gap between the core and magnets and are sequentially energized to coact with the flux to provide thrust to the vehicle.

SUMMARY OF THE INVENTION

The present invention is directed to a guideway for vehicles and more particularly to a guideway switch section and controls assuring safe travel by vehicles through the switch.

The invention employs a series of electromagnets in each of the diverging sides of the switch to selectively direct vehicle travel in the desired branch of the switch. The electromagnets simultaneously react with a vehicle borne motor section to propel the vehicle. In addition to guiding and propelling, in the case of a bicycle type vehicle, the same electromagnets provide a stabilizing force to the vehicle to prevent upset when the vehicle enters the switch region and the guideway sides diverge. If, however, the vehicle relies solely on the force of the electromagnets for its stability, failure of electric power and resultant deactivation of the magnets would result in vehicle upset or collision with the switch frog.

In normal travel along straight and curved guideway sections, that is, at other than the switch sections, the guideway is lined on its opposite parallel sides with a series of permanent (or electro) magnets each producing a substantially weaker flux than produced by the switching electromagnets. These opposing magnet series coact with the vehicle mounted rotor section of the motor to produce normal thrust, with the switching electromagnets providing thrust through the switch. In the switch region, as the guideway sides diverge, the rotor will move in the flux field of only one of the series of switching electromagnets. Thus, to produce a constant level of motor power the switch electromagnets are on the order of twice the strength of those magnets in the other sections of guideway.

At the entrance or approach to the switch section electromagnets are placed directly opposite permanent magnets. Thus the comparative field strength across the guideway will be stronger adjacent the permanent magnets when the electromagnets are deenergized and stronger on the side of the electromagnets when they are energized. Vehicle mounted sensors sense flux differential between opposing magnets and provide an output which is indicative of the selected direction of vehicle travel through the switch. This differential outputs a command to selectively deploy mechanical arms on the vehicle into confronting relation with guideway rails to serve as backups for the switch electromagnets and assure vehicle passage through the proper switch branch.

Thus the present invention combines in a novel way many features of the prior art and includes certain new features so as to attain capabilities not available in the prior systems.

DESCRIPTION OF THE DRAWINGS

FIG. 1 is schematic plan view of a switch section of a vehicle guideway with motor driving and vehicle steering magnets.

FIG. 2 is a sectional view taken at line 2—2 of FIG. 1 and including a vehicle support wheel and associated motor within the guideway.

FIG. 3 is a sectional view taken at line 3—3 of FIG. 1 and showing the vehicle steering backup locks supplementing the vehicle steering magnets.

FIGS. 4a and 4b are diagrammatic showings of the switching magnets control and magnet sensors controlling the backup locks of FIG. 3.

DESCRIPTION OF THE PREFERRED EMBODIMENTS

Figure 5:
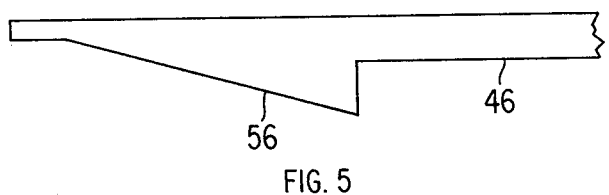
FIG. 5 is a side view of a cocking cam for the backup locks of FIG. 3.

Referring now to the drawing, at FIG. 1 is shown a switch section of a vehicle guideway having parallel sides 12 and 14 leading into the switch and then diverging to form, in conjunction with frog 16, separate branch guideways 18, 20 exiting from the switch. To each of the guideway parallel sides 12, 14 are affixed a series of uniformly spaced permanent magnets (PM) of alternating polarity which constitute the stator of a vehicle propelling linear electric motor. It is to be understood that these series of magnets could be electromagnets but, to distinguish from switching electromagnets later described, they will be referred to only as PMs.

As shown in FIG. 2 the guideway is channel shaped and serves to confine and guide the undercarriage 21 of a tandem wheeled vehicle. The one set of wheels 22 shown in FIG. 2 is supported on guideway base 24 and is restricted to travel centrally within the guideway by stabilizing wheels 26 riding against the guideway sides 12, 14. Undercarriage 21 further carries twin motor rotors 30 that sweep in close proximity to and react with the guideway magnets PM to provide thrust to the vehicle. These rotors 30 are elongated ferromagnetic cores each of which bridges several magnets in the confronting series and completes the flux paths between adjacent oppositely polarized magnets. Current conductors (not shown) across the faces of the ferromagnetic cores cut and react with the flux in the gap between the magnets and cores to generate motor force. This motor arrangement is known and does not, per se, constitute a part of the present invention.

At the portion of the switch whereat sides 12 and 14 diverge the permanent magnets PM in the series are replaced by a left and a right bank of electromagnets EM, as viewed in FIG. 1, each of which is approximately twice the strength of the PMs. Upon command from a trackside system computer (not shown) either the left bank or the right bank of electromagnets is energized to selectively attract the left or right rotor section 30 and thus constrain the vehicle to travel into exit branch 18 or 20 of the switch. FIG. 4a diagrams this control.

One important feature of this invention is the orientation of the permanent and electromagnets at the approach to the switch. In this respect, as shown in FIG. 1, the right electromagnet bank has the first of its magnets offset or staggered in relation to the first magnets in the left bank, i.e. at the switch entrance. Thus the first several electromagnets EM of the right bank lie opposite permanent magnets. Since the electromagnets are approximately double the strength of the permanent magnets, a field strength differential will at all times exist on opposite sides of the guideway where the PM and EM series overlap, the stronger field being on the left (FIG. 1) when the EM are deenergized and on the right when they are energized. This differential is employed to trigger mechanical rail locks which positively guide the vehicle through the switch.

In FIG. 4b is shown, in block diagram from, left and right magnetic detectors or sensors. In practice these sensors would be Hall detectors attached to the vehicle forward end to sweep along in close proximity to opposing magnets. Similar arrangements of Hall detectors have been employed previously for such purposes as linear motor commutation. The output signal strength of these detectors is a function of the magnetic field strength. Thus by comparing detector outputs the magnetic differential at the switch entrance is determined.

FIG. 3 provides a schematic showing of one form of mechanical rail locks using a backup means to the switching electromagnets. These locks comprise mirror image twin left and right assemblies each including a pivoted arm 40 urged upwardly by a compression spring 42. The outer or free end of arm 40 terminates in a finger 44 adapted to engage behind rail or flange 46 affixed to the guideway throughout the length of the switch section from a point in the switch entrance where sides 12 and 14 are parallel to a point past frog 16. Arms 40 are held in their cocked position, as is the left assembly in FIG. 3, by detent 48 engaging behind catch 50. Detent 48 is withdrawn from catch 50 by action of the power retractor 52 on its receipt of a signal from the comparator (FIG. 4). Prior to their entry into the switch left and right arms 40 are cocked and latched by detents 48 in their down position. One arrangement to accomplish cocking, as shown in FIG. 5, is a ramp or cam 56 on each of rails 46 at a point upstream of the switch. In riding over these cams 56 the arms 40 will be depressed and latched down by detents 50, and springs 42 compressed, thus placing the rail lock assemblies in "ready" condition prior to entry of the magnetic detectors into the unbalanced flux fields of opposing permanent and electromagnets.

Figure 6:
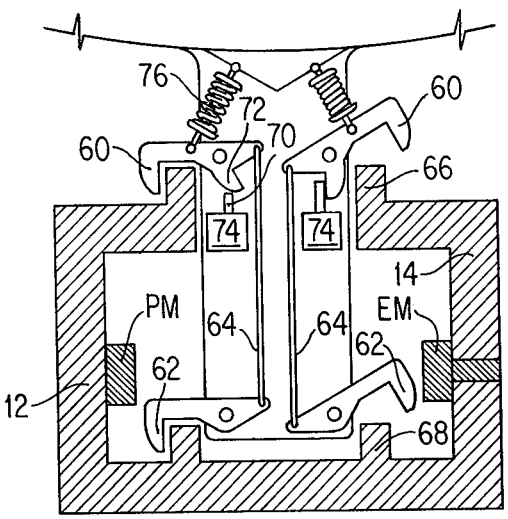
FIG. 6 is a sectional view taken at line 6—6 of FIG. 1 and showing another form of vehicle steering backup locks.

In FIG. 6 is schematically shown an alternate form of mechanical rail locks that may be employed in the place of that form shown in FIG. 3. Referring to FIG. 6 the locks consist of mirror image twin left and right assemblies each having upper and lower pivoted arms 60, 62 connected together by tie rod 64 so as to move in unison. Each of the arms 60, 62 terminates in a downwardly extending finger adapted to engage behind guideway rails 66 and 68 respectively. Just as guideway rails 46 (FIG. 3), rails 66 and 68 are affixed to the guideway sides 12 and 14 throughout the switch region. The rail locks are held in their up or cocked position by detents 70 and catches 72 in the same manner as are the rail locks of FIG. 3. Similarly detents 70 are selectively withdrawn by retractors 74 on command from the comparator (FIG. 4). Thereupon one compression spring 76 snaps arm 60 or 62 downwardly to the position assumed by the right rail lock assembly in FIG. 6. The cocking of the rail locks is accomplished by their passing over cocking cams prior to entry into the switch zones. These cocking cams are the inverted form of that shown in FIG. 5.

Although both raillocks of FIGS. 3 and 6 employ springs to urge them into rail engaging position, positive power actuators could be utilized. In addition the rail locking arms may be rollered to reduce friction and wear when engaging the rails.

At the time of vehicle entry into the switch section if the right (turn) EM bank is energized the comparator will detect its stronger field and trip the right rail lock assembly to right rail 46 engage position, as shown in FIG. 3, to positively constrain the vehicle through the switch into exit branch 20. For vehicle travel out of the switch via exit branch 18, the left EM bank will be energized, the right EM deenergized and the comparator will trip the left rail lock arm 40 behind left rail 46 for positive guidance purposes.

In the event of power supply failure to the EM banks there would of course be no magnetic force acting on the vehicle to steer or constrain its travel through the switch. The vehicle would however be guided safely through the switch by the left rail lock assembly as it is released when the right EM bank is deenergized without regard to whether the left EM bank is energized or deenergized. By a reversal of the left and right EM bank configurations, the vehicle can be made to exit through branch 20 in a power failure mode.

By its arrangement as described with respect to the preferred embodiments, the present invention provides positive vehicle propulsion and steering through a guideway switch by selective energization of a single series of electromagnets. A fail safe mode of operation is also afforded by the orientation of the electromagnets with relation to the normal permanent magnets of the vehicle motor which propel the vehicle along the through portions of the guideway. This orientation produces a control signal in accordance with the energy condition of one series of electromagnets to effect engagement of mechanical guideway followers to assure that the vehicle traverses the desired path through the switch.

Figure 7:
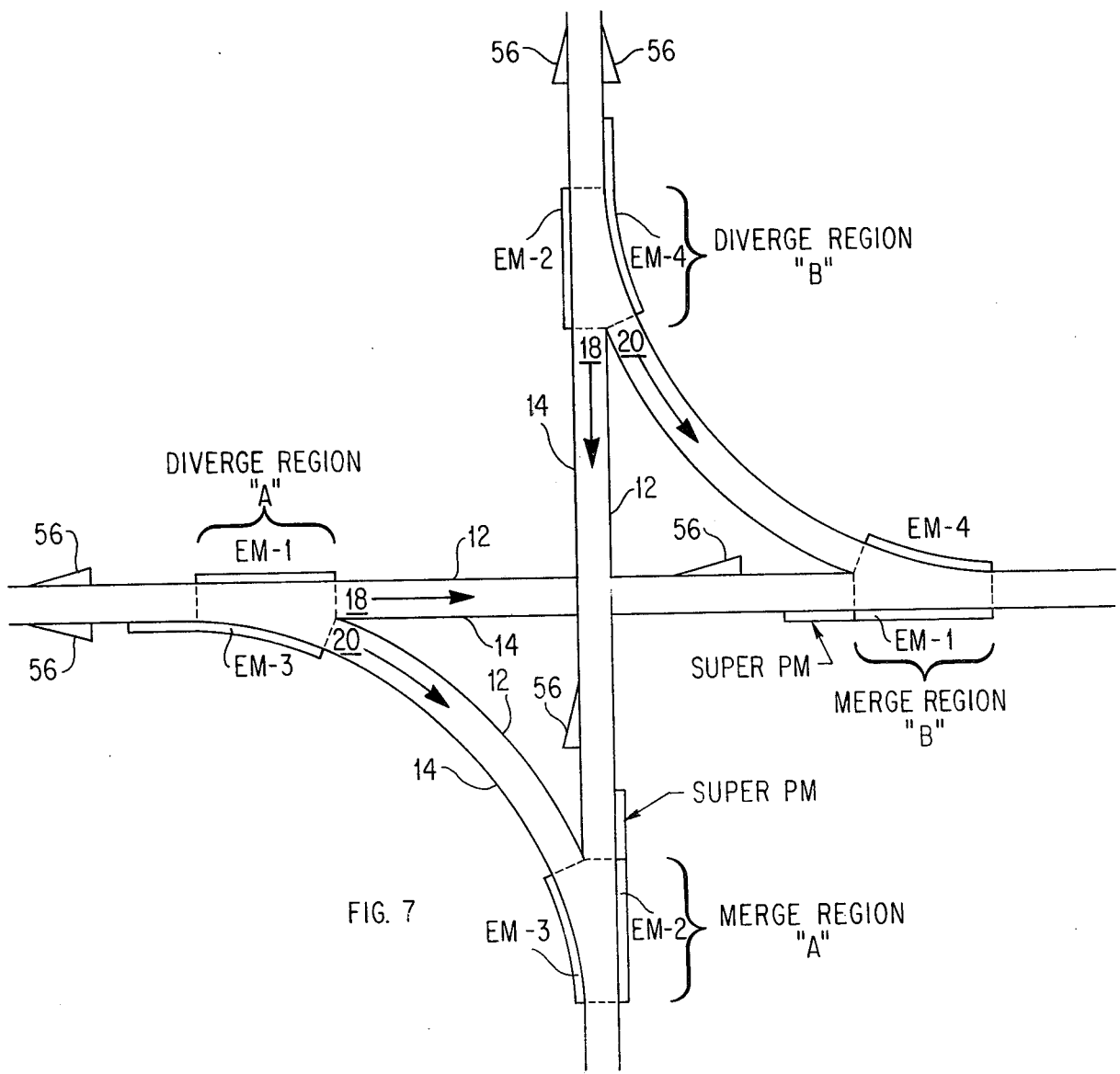
FIG. 7 is a plan view of a vehicle guideway intersection.

FIG. 7 is a schematic representation of a guideway intersection with switches and merges permitting transfer of vehicles from one intersecting line to the other. The merger of vehicles requires a special arrangement of magnets to assure that the proper rail locks are in engagement with rails 46 (or 60–62) to assure proper vehicle travel in the merge zone.

Referring to the FIG. 7 intersection, the arrows in the guideways indicate the direction of vehicle travel. EM-1 through 4 are pairs of electromagnet banks selectively energized to guide the vehicle by attraction to one or the other side of the guideway to control vehicle direction in its passage through the switches and merges. In this view diverge zone A is a mirror image of diverge zone B and merge zones A and B are also mirror images of each other. Thus the arrangements of all magnets and cocking cams are merely reversed in the construction of these mirror image zones.

Along the intersecting guideways it is to be understood that permanent magnets are mounted at uniform intervals in all zones not occupied by PMs or Super PMs as in FIG. 1. Additionally in FIG. 7 the locations of cocking cams 56 (FIG. 5) are schematically shown. The Super PM regions designated represent lengths of the guideway that are lined with permanent magnets that are equal in magnetic strength to the electromagnets and are approximately twice the strength of the other permanent magnets.

The operation of the cams 56, EMs and rail locks have been previously described with respect to Diverge Zone A, such being the switch of FIG. 1. Now considering a vehicle exiting from Diverge Zone A through switch branch 18, the controller will have engaged a rail lock with a rail 46 on side 12 of the guideway and both EM-1 banks will be energized. However in traveling into Merge Zone B it will be necessary to retract or cock the rail lock previously engaged and to release the opposite rail lock into engagement with rail 46 on guideway side 14. The retraction is accomplished by cam 56 positioned as indicated on the horizontal guideway (as viewed in FIG. 7) immediately upstream of or to the left of Merge Zone B. The release of the rail lock on guideway side 14 could be effected by the interaction of the right magnetic sensor (FIG. 4b) and EM-1 bank at the Merge Zone B. However in the event of power failure to EM-1 the rail lock would not release. Therefore, to assure this rail lock release, a short series of Super PMs is located on guideway side 14 next to EM-1 as shown. By this means there will always be a stronger magnetic field at the Super PM and the comparator will emit a release signal to the right rail lock.

Still referring to FIG. 7, a vehicle exiting from Diverge Zone A through switch branch 20 will have its right rail lock in engagement with rail 46 on side 14. Since this same rail lock will also assure proper vehicle travel into Merge Zone A no further rail lock retraction or release is required.

From the foregoing it will be seen that switching to or merging from the left or right can be accomplished by the use of the present invention.

While my invention has been described with respect to specific embodiments it is to be understood that it may be practiced through the use of other forms of apparatus within the scope of the following claims.

We claim:

1. A system for guiding vehicles through diverging branches of a switch in a vehicle guideway comprising:
   a guideway having parallel sides leading to a switch entry and said sides diverging within the switch;
   a frog switch exit branches with the diverging guideway sides;
   a series of uniformly spaced opposing magnets along said parallel sides and constituting one part of a linear electric motor;
   a series of uniformly spaced electromagnets on each of the guideway diverging sides and forming continuations in the switch of the magnet series on the parallel sides;
   means to selectively energize one or the other of the series of electromagnets to simultaneously propel and guide a vehicle through a selected one of the switch exit branches; and
   means interacting between the vehicle and the guideway to constrain vehicle travel through a selected switch exit branches in the event of electromagnet failure.

2. A system as defined in claim 1 wherein the means interacting between the vehicle and the guideway includes:
   a rail on each of the diverging sides of the guideway; and
   vehicle mounted raillocks forming followers engageable selectively with one said rail.

3. The combination defined in th claim 2, and:
   each of the diverging guideway sides have a second rail located below the first said rail, and said raillocks being simultaneously engagable with the first said rail and said second rail on the selected one of said guideway sides; and
   vehicle stabilizing wheel means in rolling contact with the selected one of side guideway sides, said wheel means coacting with the raillocks to form mechanical couples opposing side forces applied to the vehicle to prevent vehicle upset.

4. A system as defined in claim 1 wherein:
   each of the electromagnets being of approximately twice the strength of the magnets along the parallel guideway sides.

5. Apparatus as defined in claim 2 wherein:
   initial electromagnets of one of said series of electromagnets being on one parallel guideway side at the switch entry, said initial electromagnets being in opposing relation with the terminal magnets in the series of magnets along the other of the parallel guideway sides.

6. Apparatus as defined in claim 5, and:

magnetic field sensing means detecting the presence or absence of a magnetic field about said initial electromagnets, said sensing means providing an output signal indicating such presence or absence; and means responsive to the output signal controlling the engagement of the raillocks with the selected one of said rails.

7. A system as defined in claim 6 and having:

means moving the raillocks out of rail engaging position, the last said means being operable in advance of the control of the raillocks in response to the output signal.

* * * * *